F. M. KENOYER.
PIPE GRIP.
APPLICATION FILED NOV. 9, 1909.
963,584.
Patented July 5, 1910.
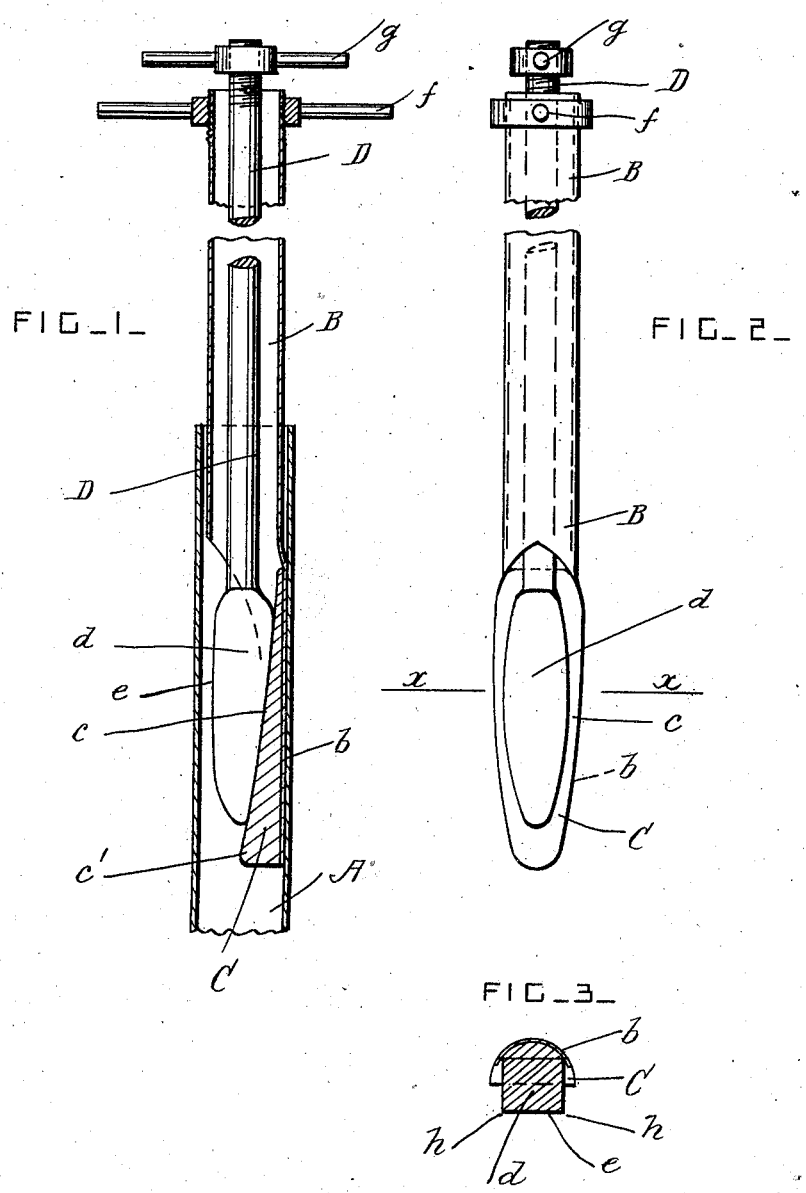

UNITED STATES PATENT OFFICE.

FRANCIS M. KENOYER, OF SUNRISE, NEBRASKA.

PIPE-GRIP.

963,584.  Specification of Letters Patent.  Patented July 5, 1910.

Application filed November 9, 1909. Serial No. 527,091.

*To all whom it may concern:*

Be it known that I, FRANCIS M. KENOYER, a citizen of the United States, residing at Sunrise, in the county of Merrick and State of Nebraska, have invented certain new and useful Improvements in Pipe-Grips; and I do hereby declare the following to be a full, clear, and exact description of the invention, such as will enable others skilled in the art to which it appertains to make and use the same.

This invention relates to gripping devices for engaging with the bore of pipes used in oil-wells and in other places for the purpose of extracting the pipes; and it consists in the novel construction and combination of the parts hereinafter fully described and claimed.

In the drawings, Figure 1 is a vertical section through a portion of an oil-well pipe showing the grip applied to it. Fig. 2 is a side view of the grip turned one-quarter around from the position shown in Fig. 1. Fig. 3 is a cross-section taken on the line $x$—$x$ in Fig. 2.

A is a portion of an oil-well pipe or any other pipe which requires to be extracted.

B is the extracting tube which is slid into the pipe A, and which is a little smaller than the pipe A for the whole of its tubular portion. The tube B has a curved end portion $b$ which projects beyond its tubular portion, and which is formed by cutting away one side portion of the tube B at its lower end. The part $b$ is preferably expanded so as to fit more closely against the inside of the pipe A than the main portion of the tube. The segmental part $b$ of the pipe forms a spring clutch-member which can be sprung laterally into contact with the outer pipe. The part $b$ is provided with a wedge C which is soldered to it, or otherwise secured to it. The wedge C has a face $c$ which is curved longitudinally and which is flat crosswise. The base $c'$ of the wedge is arranged at the lower end of the part $b$ which forms a friction clutch-member.

D is a locking-rod which extends longitudinally through the tube B. This rod $d$ has a locking-member $d$ at its lower end portion which is rectangular in cross-section, and which is curved longitudinally on all four sides, and which has a curved projection $e$ on that side of it which is arranged next to the periphery of the pipe A.

The upper end portions of the tube B and the rod D are provided with suitable handles $f$ and $g$ respectively, or any other approved devices for operating them, and these devices are preferably screwed onto them so that they may be removed when required. The tube B and the rod D are made of any convenient length, and may be formed in sections when of considerable length. The extracting tube B is lowered into the pipe A, and the locking-rod D is then lowered until the locking-member $d$ jams between the wedge C and the side of the pipe A. The sharp corners $h$ of the projection $e$ engage with the side of the pipe and cause the opposite curved side of the locking-device to bear hard on the curved face of the wedge, both parts being made of similar curvature. The tube B is then raised and extracts the pipe by the frictional contact of its clutch-members C and $d$.

What I claim is:

1. In a pipe-grip, the combination, with an extracting-tube having a projecting segmental portion which forms a spring clutch-member at its lower end and which is provided with a wedge having its thicker end arranged downward, of a locking-rod provided at its lower end with a locking-device which is rectangular in cross-section and curved longitudinally and arranged to jam between the said wedge and the side of the pipe to be extracted.

2. In a pipe-grip, the combination, with an extracting-tube having at its lower end a projecting segmental portion of larger size than its main portion and which forms a spring clutch-member, said clutch-member being provided with a wedge having a curved face and having its thicker end arranged downward, of a locking-rod provided at its lower end with a locking-device which is rectangular in cross-section and curved longitudinally and arranged to jam between the said wedge and the side of the pipe to be extracted.

In testimony whereof I have affixed my signature in the presence of two witnesses.

FRANCIS M. KENOYER.

Witnesses:
 ORVILLE D. HOFER,
 F. H. HADLEY.